(12) United States Patent
Zhang et al.

(10) Patent No.: US 12,006,969 B2
(45) Date of Patent: Jun. 11, 2024

(54) HINGE

(71) Applicant: Amphenol Phoenix (Anji) Telecom Parts Co., Ltd., Zhejiang Province (CN)

(72) Inventors: Enxie Zhang, Zhejiang Province (CN); Pingju Zeng, Zhejiang Province (CN); Huaqiao Hu, Zhejiang Province (CN); Xiaojie Liu, Zhejiang Province (CN)

(73) Assignee: AMPHENOL PHOENIX (ANJI) TELECOM PARTS CO., LTD., Zhejiang (CN)

( * ) Notice: Subject to any disclaimer, the term of this patent is extended or adjusted under 35 U.S.C. 154(b) by 146 days.

(21) Appl. No.: 17/631,064

(22) PCT Filed: Jul. 14, 2020

(86) PCT No.: PCT/CN2020/101793
§ 371 (c)(1),
(2) Date: Jan. 28, 2022

(87) PCT Pub. No.: WO2021/017808
PCT Pub. Date: Feb. 4, 2021

(65) Prior Publication Data
US 2022/0282754 A1    Sep. 8, 2022

(30) Foreign Application Priority Data
Jul. 31, 2019  (CN) .......................... 201921227727.8

(51) Int. Cl.
*E05D 7/00*    (2006.01)
*F16C 11/04*   (2006.01)
*E05D 3/12*    (2006.01)

(52) U.S. Cl.
CPC .............. *F16C 11/04* (2013.01); *E05D 3/122* (2013.01); *E05Y 2900/606* (2013.01)

(58) Field of Classification Search
CPC ........ G06F 1/16; G06F 1/1616; G06F 1/1681; G06F 1/166; G06F 1/1679; H04M 1/022;
(Continued)

(56) References Cited

U.S. PATENT DOCUMENTS 10,824,197 B1 * 11/2020 Hsu ....................... G06F 1/1641
2011/0271486 A1    11/2011 Wang et al.
(Continued)

FOREIGN PATENT DOCUMENTS

CN    201096140 Y    8/2008
CN    102777486 A    11/2012
(Continued)

*Primary Examiner* — Chuck Y Mah
(74) *Attorney, Agent, or Firm* — MUNCY, GEISSLER, OLDS & LOWE, P.C.

(57) ABSTRACT

A hinge, a left rotating bracket and a right rotating bracket of the hinge are provided on a left linkage mechanism and a right linkage mechanism and are connected to a middle support frame by the linkage mechanisms. A synchronization structure is provided between the linkage mechanisms such that the rotating brackets simultaneously rotate in a reverse direction. The rotating brackets are respectively provided with sliding connection slots. The sides of the middle support frame are provided with mechanisms for providing rotational resistance. Rotating members in the mechanisms providing rotational resistance on the sides are each provided with a connection arm. The mechanisms are slidably connected to the sliding connection slots of the rotating brackets by the connection arms, respectively. The rotating brackets of the hinge are in direct sliding connection with the rotating members in the resistance mechanisms hinged to the middle support structure by guiding slots.

8 Claims, 5 Drawing Sheets

(58) Field of Classification Search
CPC .......... H04M 1/0214; H04M 1/0216; H04M 1/0222; H05K 5/0226; F16M 11/10; F16C 11/04; E05D 11/1021; E05D 11/1078; E05D 11/082; E05D 3/14; E05D 3/18; E05D 3/122; E05D 3/12; E05D 3/16; E05D 3/06; E05D 3/32; E05D 15/28; E05D 15/30; E05D 15/32; E05D 15/40; E05D 1/04; E05D 2001/045; E05Y 2900/606

See application file for complete search history.

(56) References Cited

U.S. PATENT DOCUMENTS

| | | | |
|---|---|---|---|
| 2014/0042293 A1* | 2/2014 | Mok | H04M 1/0268 |
| | | | 248/682 |
| 2015/0267450 A1 | 9/2015 | Chang | |
| 2019/0274227 A1* | 9/2019 | Hsu | G06F 1/1652 |
| 2020/0267856 A1* | 8/2020 | Hsu | G06F 1/1641 |
| 2020/0392983 A1* | 12/2020 | Chang | G06F 1/1681 |
| 2021/0067614 A1* | 3/2021 | Cheng | G06F 1/1681 |
| 2021/0271294 A1* | 9/2021 | Liao | G06F 1/181 |
| 2022/0113769 A1* | 4/2022 | Kinoshita | E05D 3/16 |
| 2022/0162892 A1* | 5/2022 | Mitsui | F16C 11/04 |

FOREIGN PATENT DOCUMENTS

| | | |
|---|---|---|
| CN | 202811814 U | 3/2013 |
| CN | 205244112 U | 5/2016 |
| CN | 206738384 U | 12/2017 |
| CN | 210637370 U | 5/2020 |

\* cited by examiner

HINGE

TECHNICAL FIELD

The present invention relates to a hinge, particularly to a hinge of a portable electronic product, such as a flexible screen electronic product.

BACKGROUND

In flexible screen electronic products, it is generally required to provide a mechanism for providing rotational resistance to improve the operating feel or provide functions such as stopping rotation at any time and maintaining the rotation angle at any time. In a hinge that a left right rotating bracket and a right rotating bracket are respectively connected to a middle support structure by means of a linkage structure and a synchronization structure is provided between linkage mechanisms, the structure for providing resistance is often attached to a shaft of a linkage, but in this way, during the rotating stroke of the rotating bracket, the resistance mechanism cannot match with the rotating angular velocity of the rotating bracket, which affects the hand feel and is difficult to achieve the function of stopping the rotation at any time and maintaining the rotation angle at any time at the required rotation angle.

SUMMARY

The technical problem to be solved by the present invention is to provide a hinge that can synchronize the rotation of the rotating brackets with the mechanisms for providing rotational resistance as required under the condition of applying the linkage mechanisms, so as to facilitate product design and function implementation. To achieve the object, the present invention adopts the following technical solutions:

A hinge, comprising a left rotating bracket, a right rotating bracket and a middle support frame, wherein the left rotating bracket and the right rotating bracket are respectively proved on a left linkage mechanism and a right linkage mechanism and are respectively connected to the middle support frame by means of the left linkage mechanism and the right linkage mechanism, a synchronization structure is provided between the left linkage mechanism and the right linkage mechanism such that the left rotating bracket and the right rotating bracket simultaneously rotate in a reverse direction, wherein the left rotating bracket and the right rotating bracket are respectively provided with sliding connection slots, the left and right sides of the middle support frame are respectively provided with mechanisms for providing rotational resistance, moreover, rotating members in the mechanisms providing rotational resistance on the left and right sides are each provided with a connection arm, the mechanisms are slidably connected to the sliding connection slots of the left and right rotating brackets by means of the connection arms respectively.

Further, the synchronization structure adopts a gear meshing transmission mechanism, and a second structure for providing rotational resistance is also provided on a gear shaft, wherein the rotational resistance output by the mechanisms for providing rotational resistance between the left rotating bracket and the middle support frame and between the right rotating bracket and the middle support frame is larger than the rotational resistance output by the second structure as the main resistance mechanism.

Further, the sliding connection slots of the left rotating bracket and the right rotating bracket have a section of groove, and the groove is located at the beginning end or the tail end.

Further, the left linkage mechanism comprises a first linkage and a second linkage, and first ends of the first linkage and the second linkage are hinged to the left side of the middle support frame respectively, and second ends of the first linkage and the second linkage are hinged to the left rotating bracket to form a four-linkage structure; the right linkage mechanism also comprises a first linkage and a second linkage, first ends of the first linkage and the second linkage of the right linkage mechanism are hinged to the right side of the middle support frame respectively, and second ends of the first linkage and the second linkage of the right linkage mechanism are hinged to the right rotating bracket respectively to form a four-linkage structure.

Further, a gear is provided at the first end of the first linkage of the left linkage mechanism and the right linkage mechanism, and the synchronization mechanism comprises the gear, and a second structure for providing rotational resistance is formed at the gear shaft.

Further, the connection arm mate with the sliding connection slot by means of a protruding structure or a pin shaft thereon.

Further, a fixed shaft is provided on the left and right sides of the middle support frame respectively, and a reed pipe is provided on the tail end of the connection arm on the left side and right side respectively, and the reed pipes on the left side and right side clamp the fixed shaft on the left side and the fixed shaft on the right side respectively; the fixed shafts on the left side and right side are the first end of the second linkage and the connecting shaft of the middle support frame.

Further, the left rotating bracket and the right rotating bracket are respectively connected to the left case and the right case of a portable electronic product with a flexible screen.

According to the technical solutions of the present invention, the rotating brackets of the hinge are in direct sliding connection with the rotating members in the resistance mechanisms hinged to the middle support structure by means of guiding slots, thereby realizing synchronous output when resistance is required. It may also be designed to provide rotational resistance in the whole stroke or not to provide the resistance in a certain stroke according to requirements, thereby facilitating product design and function implementation. The hinge can be applied to different flexible screen electronic products.

DETAILED DESCRIPTION

Figure 1:
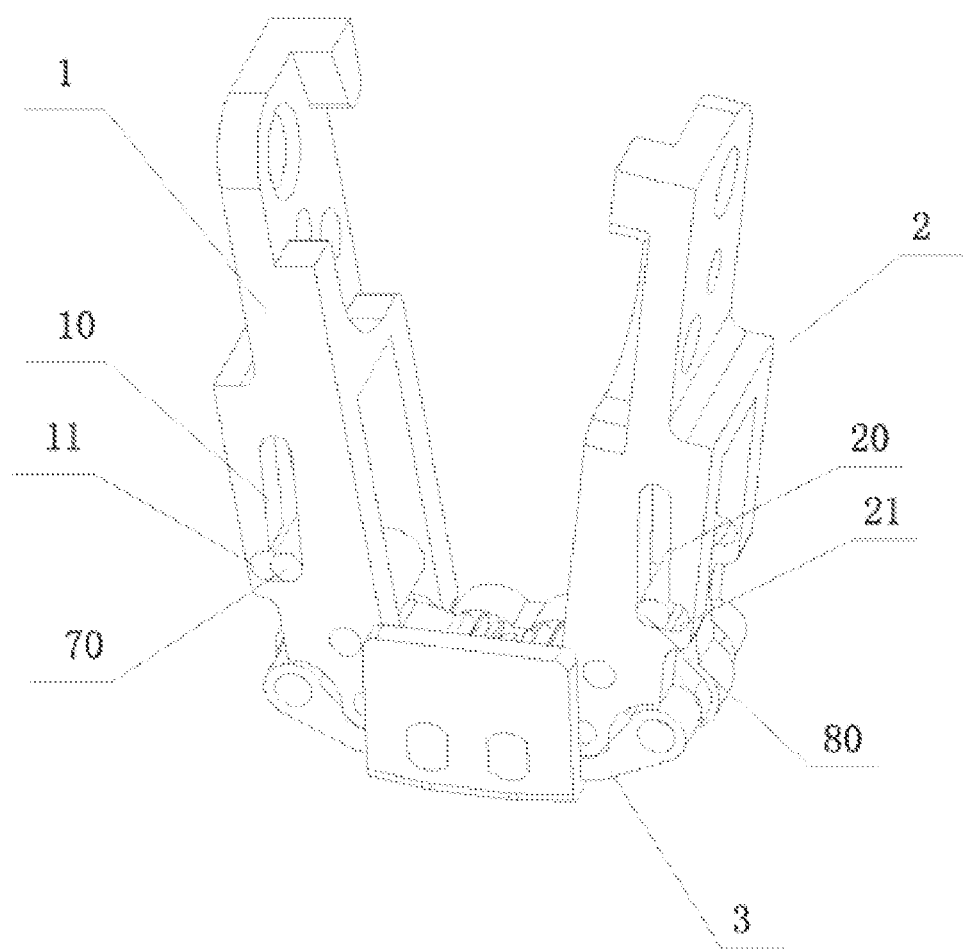
FIG. 1 is a schematic view of a hinge in a folded state according to an embodiment of the present invention.
Figure 2:
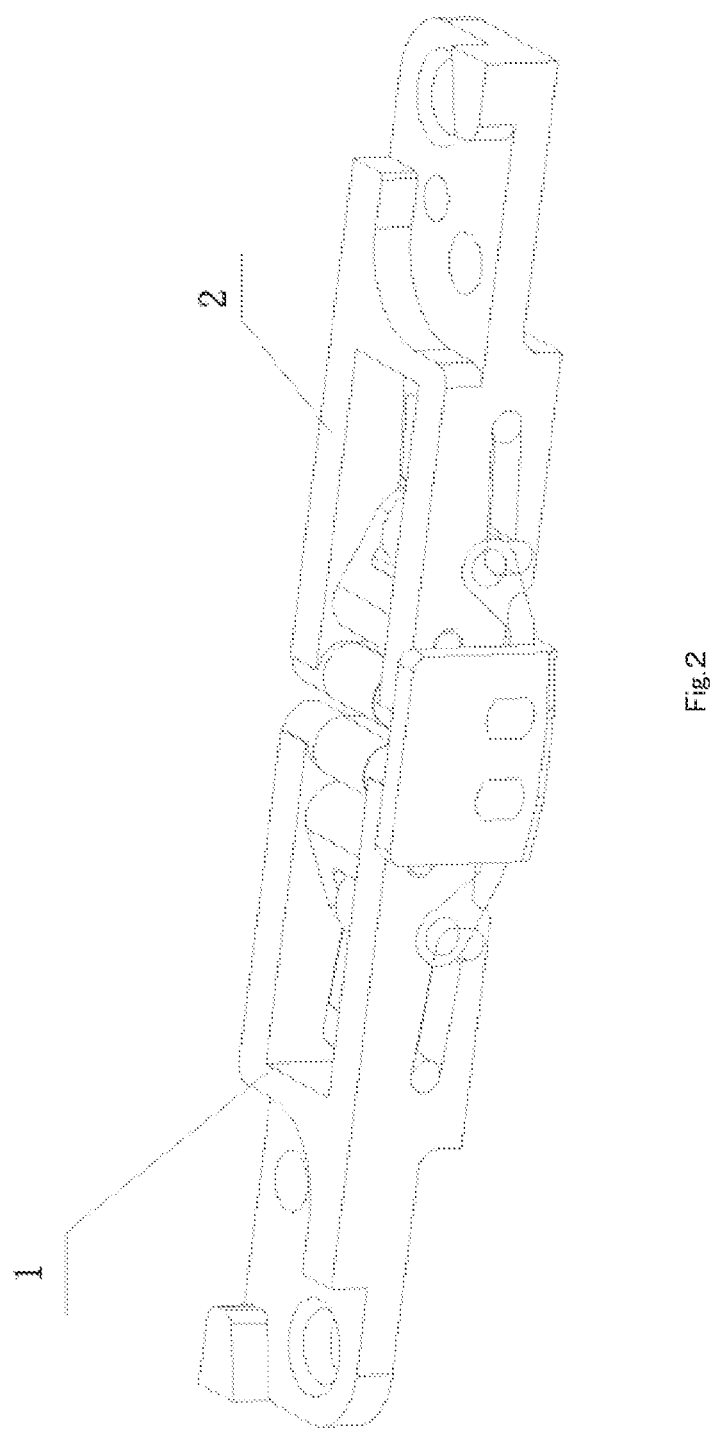
FIG. 2 is a schematic view of a hinge in an unfolded state according to an embodiment of the present invention.
Figure 3:
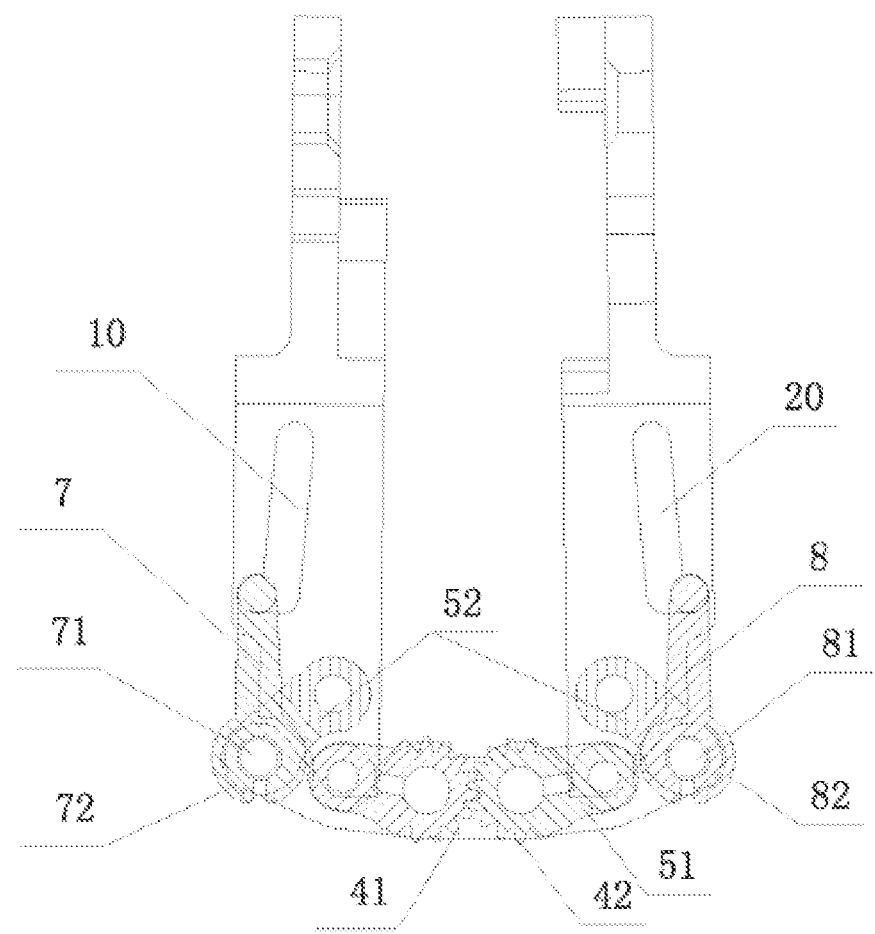
FIG. 3 is a cross-sectional view of a hinge in a folded state according to an embodiment of the present invention.
Figure 4:
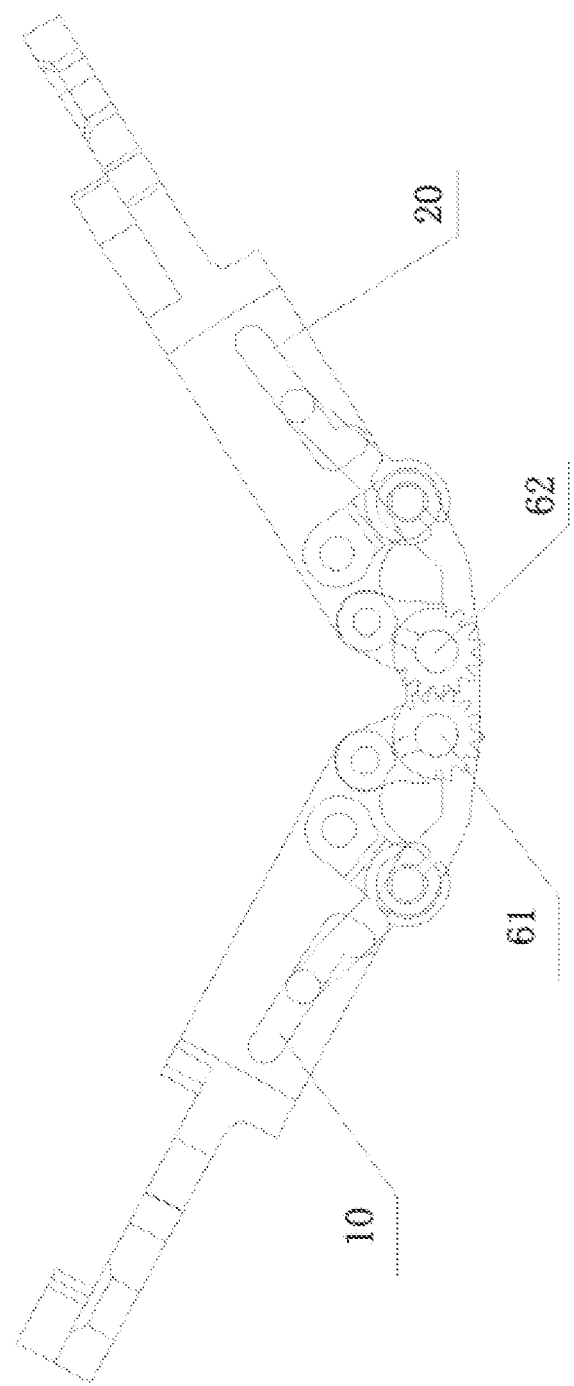
FIG. 4 is a cross-sectional view of a hinge in an intermediate state between folding and unfolding according to an embodiment of the present invention.
Figure 5:
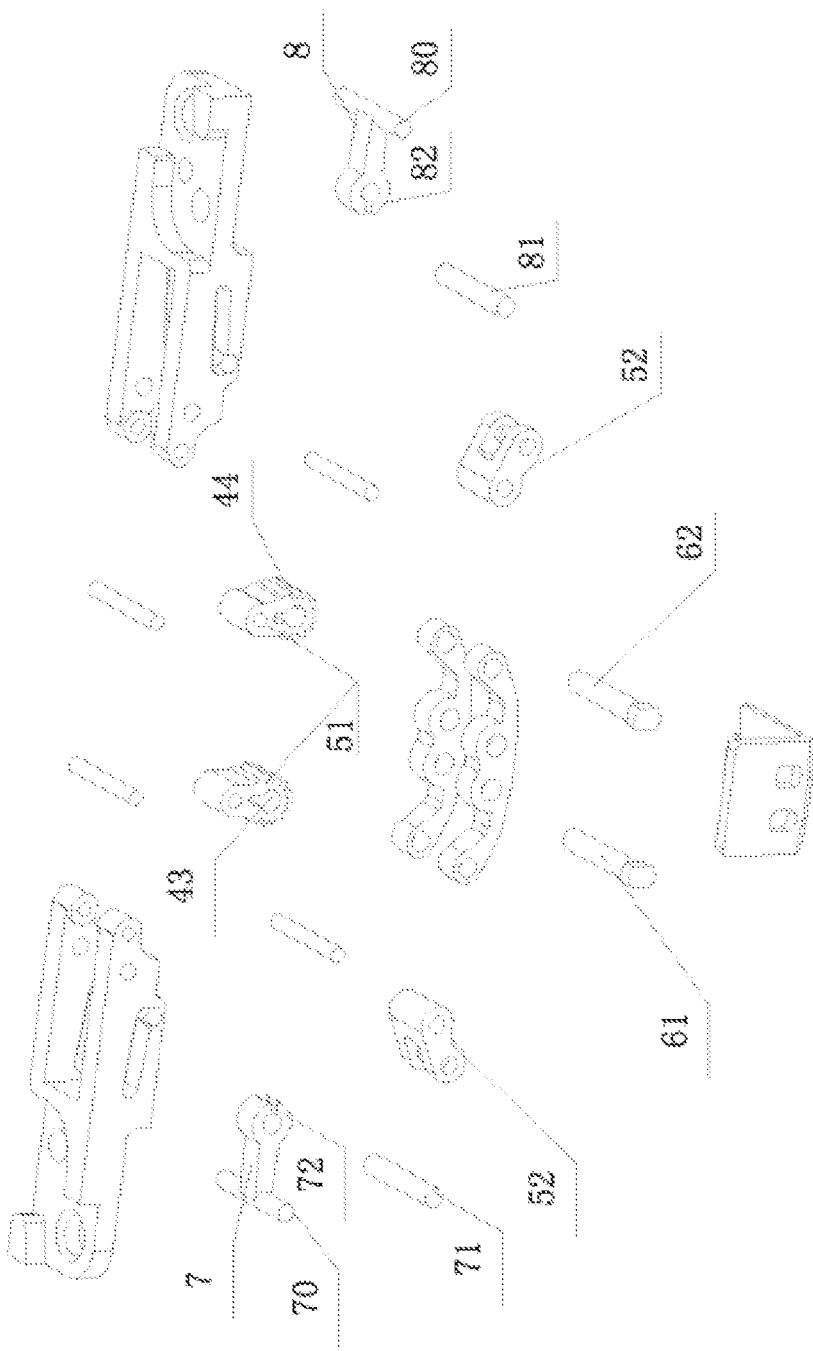
FIG. 5 is an exploded view of a hinge according to an embodiment of the present invention.

Referring to figures, the present invention provides a hinge, comprising a left rotating bracket 1, a right rotating bracket 2, and a middle support frame 3. In a portable electronic product with a flexible screen, the left rotating bracket 1 and right rotating bracket 2 are respectively connected to the left case and the right case of the portable electronic product with a flexible screen.

The left rotating bracket 1 and the right rotating bracket 2 are respectively provided on the left linkage mechanism and the right linkage mechanism, and a section of which is one of the linkages of the linkage mechanism, and is respectively connected to a middle support frame 3 by means of the left linkage mechanism and the right linkage mechanism. A synchronization structure is provided between the left linkage mechanism and the right linkage mechanism such that the left rotating bracket and the right rotating bracket simultaneously rotate in a reverse direction.

A typical linkage mechanism adopts the following structure:

The left linkage mechanism comprises a first linkage 51 and a second linkage 52, and first ends of the first linkage 51 and the second linkage 52 are hinged to the left side of the middle support frame 3 respectively, and second ends of the first linkage 51 and the second linkage 52 are hinged to the left rotating bracket 1 to form a four-linkage structure; the part on the left side of middle support frame 3 between the first ends of first linkage 51 and second linkage 52 and the part of left rotating bracket 1 between the second end of first linkage 51 and second linkage 52 respectively constitute one linkage of the four-linkage structure.

The right linkage mechanism and the left linkage mechanism are arranged symmetrically. The right linkage mechanism also comprises a first linkage 51 and a second linkage 52, first ends of the first linkage 51 and the second linkage 52 of the right linkage mechanism are hinged to the right side of the middle support frame respectively, and second ends of the first linkage 51 and the second linkage 52 of the right linkage mechanism are hinged to the right rotating bracket 2 respectively to form a four-linkage structure. The part on the right side of middle support frame 3 between the first ends of first linkage 51 and second linkage 52 and the part of right rotating bracket 1 between the second ends of first linkage 51 and second linkage 52 respectively constitute one linkage of the four-linkage structure.

The left rotating bracket 1 and the right rotating bracket 2 are respectively provided with sliding connection slots 10, 20, the left and right sides of the middle support frame are respectively provided with mechanisms for providing rotational resistance, moreover, rotating members in the mechanisms providing rotational resistance on the left and right sides are respectively provided with connection arms 7,8, the mechanisms are slidably connected to the sliding connection slots 10, 20 of the left rotating bracket 1 and the right rotating bracket 2 by means of protruding structures on the connection arms 7,8 or pin shafts 70, 80, respectively, thereby, the left rotating bracket 1 and the connection arm 7 as well as the right rotating bracket 2 and the connection arm 8 can rotate synchronously. Fixed shafts 71, 81 are provided on the left and right sides of middle support frame 3, and the ends of connection arm 7, 8 are provided with reed pipes 72, 82, respectively. The reed pipes 72, 82 clamp the fixed shafts 71, 81 respectively. The resistance produced by the mating of the reed pipe 72 and the fixed shaft 71 and the resistance produced by the mating of the reed pipe 82 and the fixed shaft 82 directly act on the left rotating bracket 1 and the right rotating bracket 2. The fixed shafts 71, 82 may be the first end of the second linkage 52 and the connecting shaft of the middle support frame 3.

Further, the sliding connection slots 10, 20 of the left rotating bracket 1 and the right rotating bracket 2 have a section of grooves 11, 21, and the grooves 11, 21 are located at the beginning ends of the sliding connection slots 10, 20. When the protruding structures on the connection arms 7,8 or pin shafts 70, 80 are located in grooves 11, 21, the rotation of left rotating bracket 1 and right rotating bracket 2 does not drive the rotation of connection arms 7, 8. At this time, the above resistance mechanism does not work, by this way, when a portable electronic product with a flexible screen is unfolded from a folded state, it can be operated loosely. This structure is particularly effective when used with a second structure for providing rotational resistance that is subordinate. The second structure can output resistance during the entire rotation stroke, but it is smaller than the resistance output by the mechanisms for providing rotational resistance between the left rotating bracket 1 and the middle support frame 3, and between the right rotating bracket 2 and the middle support frame 3, so as to provide the basic resistance for operating a portable electronic product with a flexible screen. However, since the resistance output by the second structure is small, the change of the resistance will not affect the operating feel and other functions.

The synchronization mechanism adopts a gear meshing transmission mechanism, and a second structure for providing rotational resistance is also provided at the gear shaft. The first ends of the first linkage 51 of the left linkage mechanism and the right linkage mechanism are respectively provided with gears 41, 42. The gears 41, 42 are meshed and connected to form the synchronization structure, and central holes 43, 44 of the gears 41, 42 are holes with elastic deformation, which clamp the gear shafts 61, 62 fixed on the middle support frame 3, to form the second structure for providing rotational resistance. Gear shafts 61, 62 are the first end of the first linkage of the left linkage mechanism and the right linkage mechanism, and the connecting shaft of the middle support structure 3, respectively.

The above description only describes specific embodiments of the present invention, but the structural features of the present invention are not limited thereto. Any changes or modifications made by those skilled in the art in the field of the present invention shall fall within the scope of protection of the present invention.

The invention claimed is:

1. A hinge, comprising a left rotating bracket, a right rotating bracket and a middle support frame, wherein the left rotating bracket and the right rotating bracket are respectively provided on a left linkage mechanism and a right linkage mechanism and are respectively connected to the middle support frame by the left linkage mechanism and the right linkage mechanism, a synchronization structure is provided between the left linkage mechanism and the right linkage mechanism such that the left rotating bracket and the right rotating bracket simultaneously rotate in a reverse direction, wherein the left rotating bracket and the right rotating bracket are respectively provided with sliding connection slots, the left and right sides of the middle support frame are respectively provided with rotational resistance mechanisms for providing rotational resistance each includes a rotating member rotating on a shaft and a connection arm slidably connected to the sliding connection slots of the left and right rotating brackets.

2. The hinge according to claim 1, wherein the synchronization structure adopts a gear meshing transmission mechanism, and a second structure for providing rotational resistance is also provided on each gear shaft, wherein the rotational resistance output by the rotational resistance mechanisms is larger than the rotational resistance output by the second structure.

3. The hinge according to claim 1, wherein the sliding connection slots of the left rotating bracket and the right rotating bracket have a section of groove, and the groove is located at beginning end or a tail end of the sliding connection slots.

4. The hinge according to claim 1, wherein the left linkage mechanism comprises a first linkage and a second linkage, and first ends of the first linkage and the second linkage are hinged to the left side of the middle support frame respectively, and second ends of the first linkage and the second linkage are hinged to the left rotating bracket to form a four-linkage structure;

the right linkage mechanism also comprises a first linkage and a second linkage, first ends of the first linkage and the second linkage of the right linkage mechanism are hinged to the right side of the middle support frame respectively, and second ends of the first linkage and the second linkage of the right linkage mechanism are hinged to the right rotating bracket respectively to form a four-linkage structure.

5. The hinge according to claim 4, wherein a gear is provided at the first end of the first linkage of the left linkage mechanism and the right linkage mechanism, and the synchronization mechanism comprises the gear, and a second structure for providing rotational resistance is formed at each gear shaft.

6. The hinge according to claim 5, wherein a fixed shaft is provided on the left and right sides of the middle support frame respectively, and a reed pipe is provided on a tail end of the connection arm on the left side and right side respectively, and the reed pipes on the left side and right side clamp the fixed shaft on the left side and the fixed shaft on the right side respectively; the fixed shafts on the left side and right side are the first end of the second linkage and the connecting shaft of the middle support frame.

7. The hinge according to claim 1, wherein each connection arm mate with the sliding connection slot by means of a protruding structure or a pin shaft thereon.

8. The hinge according to claim 1, wherein the left rotating bracket and the right rotating bracket are respectively connected to the left case and the right case of a portable electronic product with a flexible screen.

* * * * *